US 11,801,901 B2

(12) United States Patent
Tabakovic et al.

(10) Patent No.: US 11,801,901 B2
(45) Date of Patent: Oct. 31, 2023

(54) BODY AND DOORS PROTECTION ASSEMBLY FOR A VEHICLE

(71) Applicant: Volvo Car Corporation, Gothenburg (SE)

(72) Inventors: Sreten Tabakovic, Gothenburg (SE); Pawel Kwasniak, Gothenburg (SE); Piotr Dolega, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/807,968

(22) Filed: Jun. 21, 2022

(65) Prior Publication Data

US 2022/0410979 A1   Dec. 29, 2022

(30) Foreign Application Priority Data

Jun. 23, 2021   (EP) .................................... 21181081

(51) Int. Cl.
*B62D 25/12* (2006.01)
*B62D 21/15* (2006.01)
(Continued)

(52) U.S. Cl.
CPC ............. *B62D 25/12* (2013.01); *B62D 21/15* (2013.01); *B62D 25/04* (2013.01); *B62D 25/08* (2013.01); *B62D 25/105* (2013.01)

(58) Field of Classification Search
CPC ...... B62D 25/08; B62D 25/105; B62D 25/12; B62D 21/15; B62D 21/152
(Continued)

(56) References Cited

U.S. PATENT DOCUMENTS 6,926,349 B2 * 8/2005 Cordebar .............. F16B 5/0628
29/469
7,802,345 B2 * 9/2010 Mathew .................. E05D 15/46
296/193.11
(Continued)

FOREIGN PATENT DOCUMENTS

WO   2020126599 A1   6/2020

OTHER PUBLICATIONS

Extended EP Search Report for EP Application No. 21181081.7 dated Jan. 14, 2022.

*Primary Examiner* — Dennis H Pedder
(74) *Attorney, Agent, or Firm* — Amin, Turocy & Watson, LLP

(57) ABSTRACT

The present disclosure relates to a body and doors protection assembly for a vehicle, a hood assembly comprising such a body and doors protection assembly, a vehicle comprising such a hood assembly and a manufacturing method for such a body and doors protection assembly.
The body and doors protection assembly comprises a first protecting member, a second protecting member and a sliding member. The first protecting member is attachable on an inner surface of a vehicle hood at a rear edge of the vehicle hood. The second protecting member is attachable in a front side portion of a vehicle body facing the rear edge of the vehicle hood in a closed position of the vehicle hood. The sliding member is at least partially enclosed in the second protecting member and configured to contact the first protecting member in the closed position of the vehicle hood. The sliding member is movable in a lateral direction relative to the vehicle hood in the closed position of the vehicle hood.

15 Claims, 5 Drawing Sheets

(51) Int. Cl.
  *B62D 25/04* (2006.01)
  *B62D 25/10* (2006.01)
  *B62D 25/08* (2006.01)
(58) Field of Classification Search
  USPC .............. 296/187.09, 187.1, 193.11, 193.09
  See application file for complete search history.

(56) References Cited

U.S. PATENT DOCUMENTS

| | | |
|---|---|---|
| 8,899,363 B1 | 12/2014 | LaPorte et al. |
| 2006/0175115 A1 | 8/2006 | Howard |

\* cited by examiner

BODY AND DOORS PROTECTION ASSEMBLY FOR A VEHICLE

TECHNICAL FIELD

The present disclosure relates to a body and doors protection assembly for a vehicle, a hood assembly comprising such a body and doors protection assembly, a vehicle comprising such a hood assembly and a manufacturing method for such a body and doors protection assembly.

BACKGROUND ART

Conventionally, a hood of a motor vehicle is arranged to protect an engine compartment of the vehicle. In case of a collision, however, the hood may be folded, shoved or even invaded a front windshield, which may cause a severe damage on surrounding components such as the front windshield, front doors and/or an A-pillar. A subsequent repair or replacement of the hood and its surrounding components may be often complicated, which may increase repair costs.

SUMMARY

Hence, there may be a need to provide an improved a body and doors protection assembly for a vehicle, which limits a movement or deformation of a hood in case of a vehicle collision to protect its surrounding components.

The problem is solved by the subject matters of the independent claims of the present disclosure, wherein further embodiments are incorporated in the dependent claims. It should be noted that the aspects of the disclosure described in the following apply to the body and doors protection assembly for a vehicle, the hood assembly comprising such a body and doors protection assembly, the vehicle comprising such a hood assembly and the manufacturing method for a body and doors protection assembly in a vehicle.

According to the present disclosure, a body and doors protection assembly for a vehicle is presented. The body and doors protection assembly comprises a first protecting member, a second protecting member and a sliding member. The first protecting member is attachable on an inner surface of a vehicle hood at a rear edge of the vehicle hood. The second protecting member is attachable in a front side portion of a vehicle body facing the rear edge of the vehicle hood in a closed position of the vehicle hood. The sliding member is at least partially enclosed in the second protecting member and configured to contact the first protecting member in the closed position of the vehicle hood. The sliding member is adjustable in a lateral direction relative to the vehicle hood in the closed position of the vehicle hood.

The body and doors protection assembly may be configured to protect a vehicle body and vehicle doors in case of a collision of the vehicle. The body and doors protection assembly may stop a movement of the vehicle hood at the rear edge of the vehicle hood. Particularly, in case of a low-speed crash of the vehicle, the movement of vehicle hood in direction of a windshield may be effectively stopped so that no damage to a windshield, front doors and/or A-pillars may occur. In addition, the body and doors protection assembly may be easily adjustable for an optimal stop function after the vehicle hood is closed. Accordingly, the body and doors protection assembly may enable saving manufacturing time and costs.

The body and doors protection assembly may be substantially divided into a first part and a second part. The first part may comprise the first protecting member, which may be fixedly attached on the inner surface of the vehicle hood facing a motor compartment of the vehicle. Preferably, the first protecting member may be arranged at the rear edge of the vehicle hood, wherein the rear edge of the vehicle hood may face a bottom portion of a front windshield of the vehicle. Accordingly, the rear edge of the vehicle hood may be arranged substantially perpendicular to a longitudinal direction of the vehicle body. The term "front" may refer to a forward direction of a vehicle in driving. Preferably, the first protecting member may be arranged on the inner surface of the vehicle hood at a lateral side of the rear edge relative to a longitudinal direction of the vehicle body.

The second part may comprise the second protecting member and the sliding member. At least a part of the sliding member may be arranged inside the second protecting member. The second protecting member may be fixedly attached in the front side portion of the vehicle body. The vehicle body may be understood as a main supporting structure, i.e. chassis of the vehicle, to which all components of the vehicle may be attached. For instance, the vehicle hood may be pivotably mounted at a front portion of the vehicle body.

The front side portion of the vehicle body may refer to a lateral side of the vehicle body at a front part of the vehicle body with respect to a forward driving direction of the vehicle. For instance, at the front side portion of the vehicle body, the front doors may be mounted. Hence, if the vehicle hood, which is mounted at the vehicle body, is closed, the rear edge of the vehicle hood may face the front side portion of the vehicle body. Consequently, in the closed position of the vehicle hood, the first protecting member and the second protecting member may face each other.

In the closed position of the vehicle hood, the sliding member may come into contact with the first protecting member. Generally, in case of a vehicle collision, especially in case of a frontal collision, the vehicle hood may receive collision energy. If the collision energy is higher than an assembly tolerance of the vehicle hood at the vehicle body, the vehicle hood may be at least displaced and/or even damaged.

In such a case, however, the sliding member may be adjusted by moving in the lateral direction, which is perpendicular relative to the longitudinal direction of the vehicle body. Accordingly, the sliding member may adjust a lateral displacement of the vehicle hood, even the assembly tolerance of the vehicle hood at the vehicle body is exceeded due to the collision. The assembly tolerance may be understood as a threshold of an assembled equipment, which may be a maximum mechanical stress exerted on the assembled equipment without any deformation or displacement of the assembled equipment.

Accordingly, the sliding member may transfer stress exerted on the vehicle hood, for instance due to the collision, to the second protecting member. In other words, the stress, which is exerted on the vehicle hood and exceeds the assembly tolerance of the vehicle hood, may be discharged to the second protecting member via the sliding member. Hence, a damage risk of the vehicle hood due to a collision may be reduced.

In an example, the sliding member comprises a sliding body and a shank. The sliding body is connected to one end of the shank and adjustable with the shank. The shank may comprise a first end and a second end. The first end of the shank may be connected to a first lateral surface of the sliding body and the second end of the shank may be adjacent to an outer lateral surface of the first protecting member, which may be arranged at an opposite side of the sliding body relative to the shank. Additionally, the second end of the shank may penetrate the outer lateral surface of the first protecting member and it may be connectable to the front side portion of the vehicle body.

The sliding body may comprise the first lateral surface and a second lateral surface. The first lateral surface of the sliding body may be connected to the first end of the shank and the second lateral surface of the sliding body may contact the first protecting member in the closed position of the vehicle hood. The sliding body may shift its position outwardly in the lateral direction of the vehicle hood along the shank, to adjust a position of the vehicle hood in the lateral direction in case of the vehicle collision.

In an example, the sliding member further comprises a nut arranged through the shank. The nut is configured to keep the sliding body in position along the shank. The nut may be a locking nut and/or a movable nut. In other words, the nut may be fixedly positioned on the shank such that in case of the lateral movement of the sliding body, preferably outwardly, the nut may limit the movement of the sliding body along the shank. Alternatively, the nut may be arranged movably along a longitudinal axis of the shank such that the sliding body may relieve the stress transferred from the first protecting member. Accordingly, the nut may allow the sliding body stay in position along the longitudinal axis of the shank.

In an example, the sliding member comprises a lateral supporting portion. The lateral supporting portion is arranged at an opposite side of the shank relative to the sliding body and configured to block a movement of the first protecting member in the lateral direction of the vehicle hood. The lateral supporting portion may be integrally manufactured with the sliding body. Alternatively, the lateral supporting portion may be independently formed of the sliding body.

The lateral supporting portion may be arranged at an opposite side of the shank relative to the sliding body, which is also connected to the sliding body. The lateral supporting portion may be arranged substantially perpendicular to the longitudinal axis of the shank. The term "substantially perpendicular" may be understood as an angle, which may be in a range of 45 to 135 degrees.

The lateral supporting portion may directly contact the first protecting member in the closed position of the vehicle hood. Hence, the lateral supporting portion may be configured to effectively catch or support the movement of the first protecting member, particularly in the lateral direction of the vehicle hood in case of the displacement of the vehicle hood due to the collision.

In an example, the sliding member further comprises a longitudinal supporting portion. The longitudinal supporting portion is arranged substantially perpendicular to the lateral supporting portion and configured to block the movement of the first protecting member in a longitudinal direction of the vehicle body.

The longitudinal supporting portion may be integrally manufactured with the lateral supporting portion and/or the sliding body. Alternatively, the longitudinal supporting portion may be formed independently of the lateral supporting portion and/or the sliding body. The longitudinal supporting portion may be also arranged at an opposite side of the shank relative to the sliding body. The longitudinal supporting portion may be arranged substantially parallel to the longitudinal axis of the shank and/or to the rear edge of the vehicle hood.

The longitudinal supporting portion may directly contact the first protecting member in the closed position of the vehicle hood. Hence, the longitudinal supporting portion may be configured to effectively catch or block the movement of the first protecting member, particularly in the longitudinal direction of the vehicle body in case of the displacement of the vehicle hood due to the collision. Accordingly, the vehicle hood may be prevented from being invaded in direction of the windshield, A-pillars and/or front doors of the vehicle.

In an example, the first protecting member comprises at least one clamping element to fixedly attach the first protecting member to the inner surface of the vehicle hood. To fixedly hold the first protecting member at the vehicle hood, the first protecting member may comprise one or more clamping elements, which may be directly connected to the inner surface of the vehicle hood. The clamping element may comprise a clip means or a locking means. The first protecting member may be, hence, fixed at the inner surface of the vehicle hood without any guide pins and/or other fasteners. Alternatively, the first protecting member may be fixedly attached to the inner surface of the vehicle hood by adhesion, form-fitting means, force-fitting means, soldering, welding, etc.

In an example, the second protecting member comprises a base portion and a cover portion. The base portion and the cover portion are connected to each other by a fastening means. The base portion of the second protecting member may be fixedly attached to the front side portion of the vehicle body, to which a front door of the vehicle may be mounted. The cover portion may be attached to the base portion may means of fasteners or clips. Alternatively, the cover portion may be mounted at the base portion by a hinge means. The second protecting member may at least partially enclose the sliding body and the shank of the sliding member between the base portion and the cover portion.

In an example, the base portion of the second protecting member comprises a guide, on which the sliding member is movable. The guide may be formed stepless such that the sliding member, preferably the sliding body may slide smoothly on the guide. A surface of the guide contacting the sliding body may cause friction while moving the sliding body. Hence, the collision energy may be dissipated to overcome the friction between the guide and the sliding body and the guide may allow a controlled path of the vehicle hood.

Accordingly, even though the base portion of the second protecting member may be arranged along a curved contour of front side portion of the vehicle body, the sliding body may be gradually pushed along the shank to avoid damage on surrounding components of the vehicle hood. In other words, a position of the sliding body inside the second protecting member may be adjusted without any bounce, despite the displacement of the vehicle hood due to the collision.

In an example, the second protecting member comprises at least one fixing element arrangeable at the front side portion of the vehicle body to fixedly attach the second protecting member to the vehicle body. The second protecting member, preferably, the base portion may be fixed by means of one or more fixing elements at the front side portion of the vehicle body, at which a front door of the vehicle may be arranged.

The front side portion of the vehicle body may comprise a bracket, which may made of a metal material such as steel. The bracket may be integrally arranged at the front side portion of the vehicle body and comprise one or more bolts, which may be welded to the bracket. The base portion may be fixed at the bracket by means of corresponding nuts.

Alternatively, the base portion of the second protecting member may be fixedly attached to the front side portion of the vehicle body by adhesion, form-fitting means, force-fitting means, soldering, welding, etc.

In an example, the body and doors protection assembly further comprises a seal protect member arrangeable at the front side portion of the vehicle body and at least partially surrounding the first protecting member, the second protecting member and/or the sliding member. The seal protect member may be configured to additionally protect the surrounding components of the vehicle hood such as the front door, A-pillar, windshield, etc. The seal protect member may be thus arranged between the front side portion of the vehicle body and the second protecting member and extends at least partially, preferably entirely over the first protecting member, the second protecting member and/or the sliding member in the closed position of the vehicle hood.

In an example, the first protecting member, the second protecting member and/or the sliding member are individually replaceable in case of a damage. After the displacement of the vehicle hood due to the collision, first protecting member, the second protecting member and/or the sliding member may be also displaced or damaged. In such a case, the body and doors protection assembly may enable an easy repair of the body and doors protection assembly, since first protecting member, the second protecting member and the sliding member may be separately manufactured and individually arranged on the inner surface of the vehicle hood and at the front side portion of the vehicle body. After the repair, a new first protecting member, a new second protecting member and/or a new sliding member can be easily adapted to one another.

In an example, the first protecting member, the second protecting member, the sliding member and/or the seal protect member may comprise a plastic material such as two components material including thermoplastic elastomer material, which may stretch to moderate elongations and return to its near original shape.

According to the present disclosure, a hood assembly is presented. The hood assembly comprises a vehicle hood and a body and doors protection assembly as described above. A montage, repair and/or maintenance work of the hood assembly may be facilitated by arranging the body and doors protection assembly, which may be separately manufactured and individually arranged on an inner surface of the vehicle hood and at a front side portion of a vehicle body.

According to the present disclosure, a vehicle is presented. The vehicle comprises a hood assembly as described above. In an example, a body and doors protection assembly is arranged on a junction portion of a vehicle body, at which an A-pillar, a front door and/or a rear edge of a vehicle hood join. The vehicle hood may be an overwrap type hood, which may be arranged directly adjacent to the A-pillar and the front door of the vehicle.

In an example, each front side portion of the vehicle body, at which each front door of a driver side and a front passenger side may be mounted, may comprise the body and doors protection assembly. The body and doors protection assembly may stop or limit a movement of the vehicle hood and/or steer out collision energy to effectively protect the surrounding components. A controlled path of the vehicle hood during the collision may be ensured by adjusting a sliding member in a second protecting member with friction which dissipates the collision energy.

According to the present disclosure, a manufacturing method for a body and doors protection assembly in a vehicle is presented. The manufacturing method comprises attaching a first protecting member on an inner surface of a vehicle hood at a rear edge of the vehicle hood, attaching a second protecting member in a front side portion of a vehicle body facing the rear edge of the vehicle hood, and establishing of contact the first protecting member and the second protecting member by a sliding member in a closed position of the vehicle hood.

The sliding member is adjustable in a lateral direction relative to the vehicle hood.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter in the closed position of the vehicle hood.

BRIEF DESCRIPTION OF DRAWINGS

Exemplary embodiments will be described in the following with reference to the following drawings.

DESCRIPTION OF EMBODIMENTS

Figure 1:
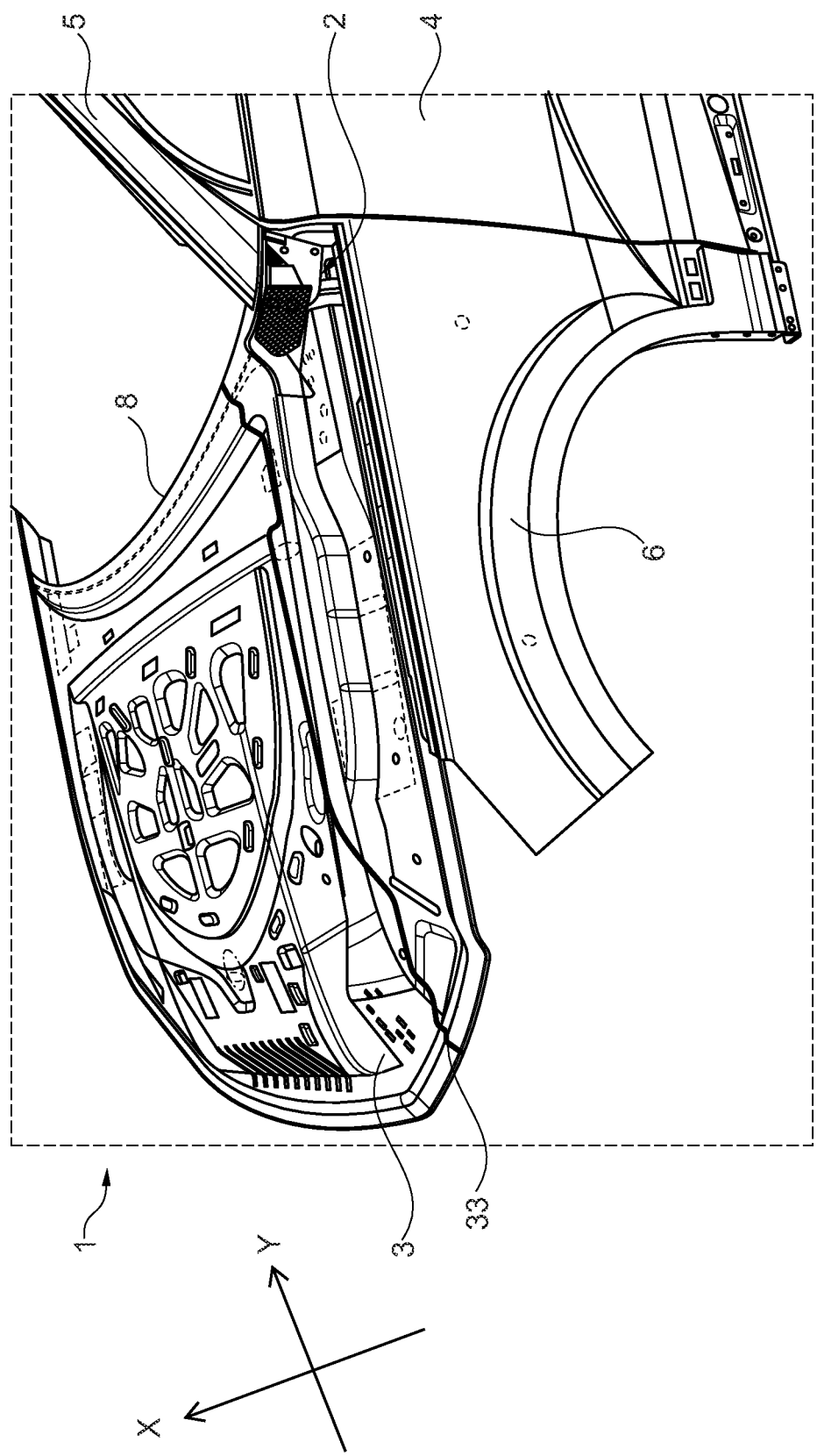
FIG. 1 shows schematically and exemplarily an embodiment of a vehicle according to the present disclosure.

FIG. 1 shows a vehicle 1 comprising a vehicle hood 3 and a body and doors protection assembly 2. The vehicle hood 3 is an overwrap type hood, which may be arranged directly adjacent to an A-pillar 5 and a front door 4 of the vehicle 1. The body and doors protection assembly 2 is arranged on a junction portion 9 of a vehicle body 7 (see FIG. 2 and FIG. 3), at which the A-pillar 5, the front door 4 and/or a rear edge 8 of the vehicle hood 3 join. Hence, the vehicle 1 comprises preferably two protection assemblies 2 at each junction portion 9 of the vehicle body 7.

The body and doors protection assembly 2 comprises a first protecting member 10, a second protecting member 20 and a sliding member 30. The first protecting member 10, the second protecting member 20 and/or the sliding member 30 can be separately manufactured and they are individually arranged in the vehicle 1. Accordingly, each of the first protecting member 10, the second protecting member 20 and/or the sliding member 30 is individually replaceable if a repair is required.

The body and doors protection assembly 2 is configured to protect the vehicle body 7 and its surrounding components such as front door 4, A-pillar 5 and front fender 6. In case of a collision, particularly if collision energy exceeds a predefined assembly tolerance of the vehicle hood 3, the vehicle hood 3 may be pushed in various directions. The body and doors protection assembly 2 stops a movement of the vehicle hood 3 in direction of a windshield of the vehicle 1 to avoid a windshield damage and to protect the front door 4 and/or the A-pillar 5. Further, the body and doors protection assembly 2 may relieve the collision energy via the sliding member 30 in a lateral direction X of the vehicle hood 3.

Figure 7:
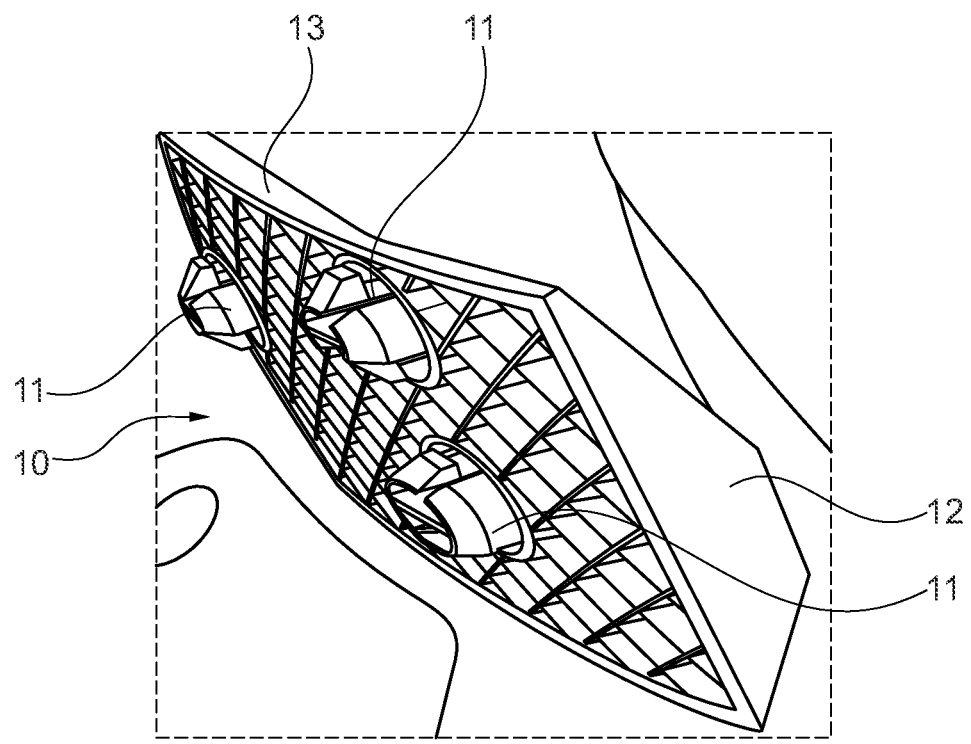
FIG. 7 shows schematically and exemplarily an embodiment of a first protecting member according to the present disclosure.

The first protecting member 10 is attachable on an inner surface 33 of the vehicle hood 3 at the rear edge 8 of the vehicle hood 3 (see FIG. 1). As shown in FIG. 7, the first protecting member 10 comprises three clamping elements 11 to fixedly attach the first protecting member 10 to the inner surface 33 of the vehicle hood 3.

Figure 4:
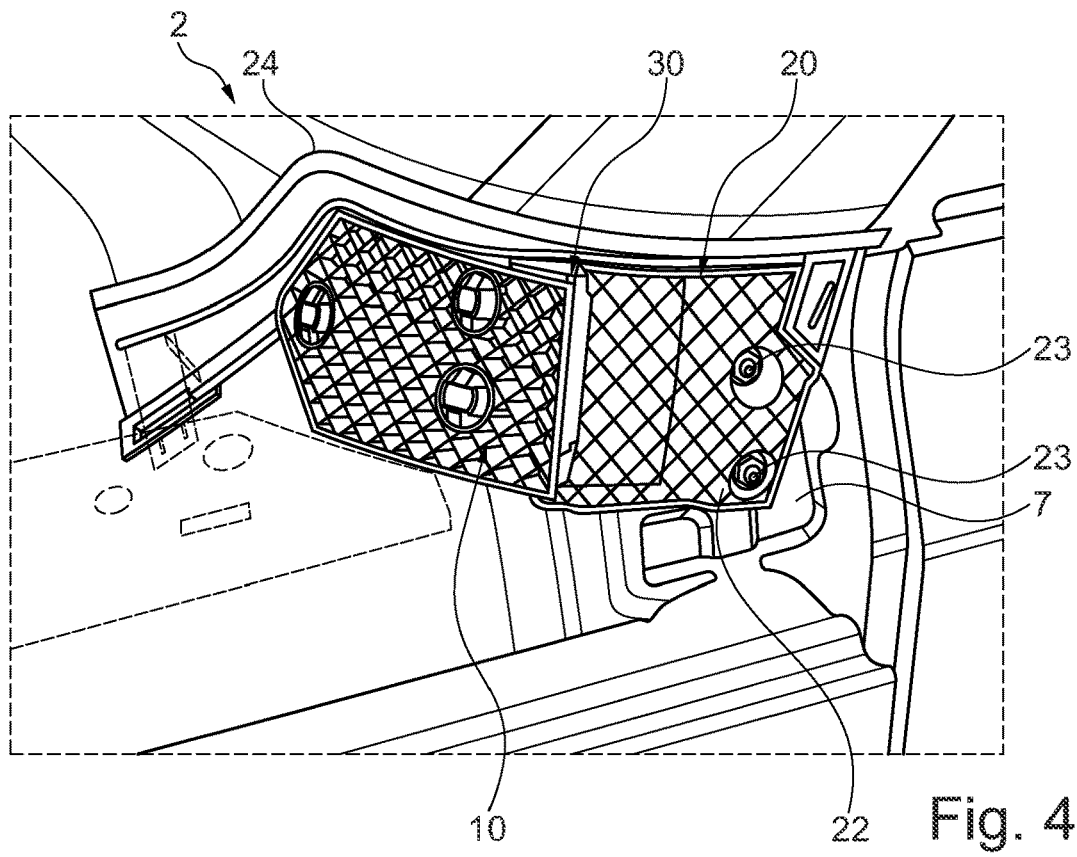
Figure 5:
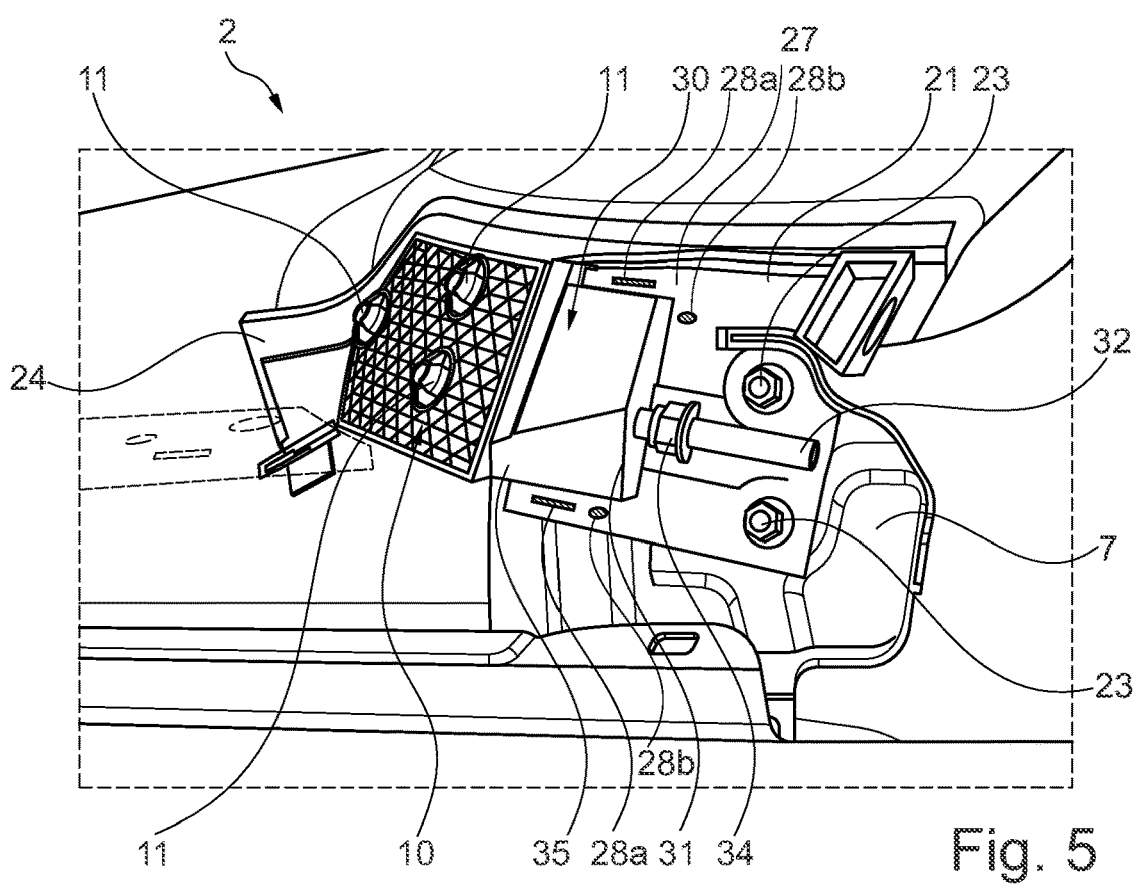

The second protecting member 20 comprises a base portion 21 and a cover portion 22 (see FIG. 4 and FIG. 5). The base portion 21 and the cover portion 22 are connected to each other by a fastening means 28. The fastening means comprises two clips 28a for fixing the base portion 21 and the cover portion 22 in a longitudinal direction Y of the vehicle body 7 and two pins 28b for fixing them in the lateral direction X relative to the vehicle hood 3. The base portion 21 of the second protecting member 20 comprises a guide 27, on which the sliding member 30 is movable.

Figure 2:
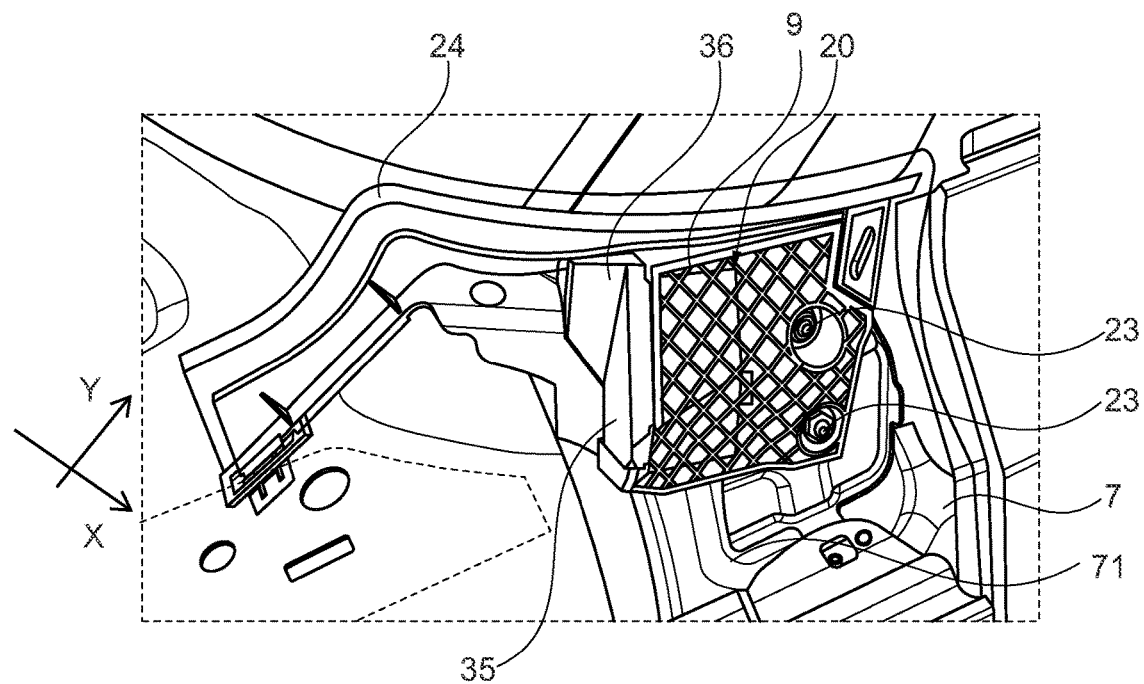
FIG. 2 to FIG. 5 show schematically and exemplarily an embodiment of a body and doors protection assembly according to the present disclosure.
Figure 3:
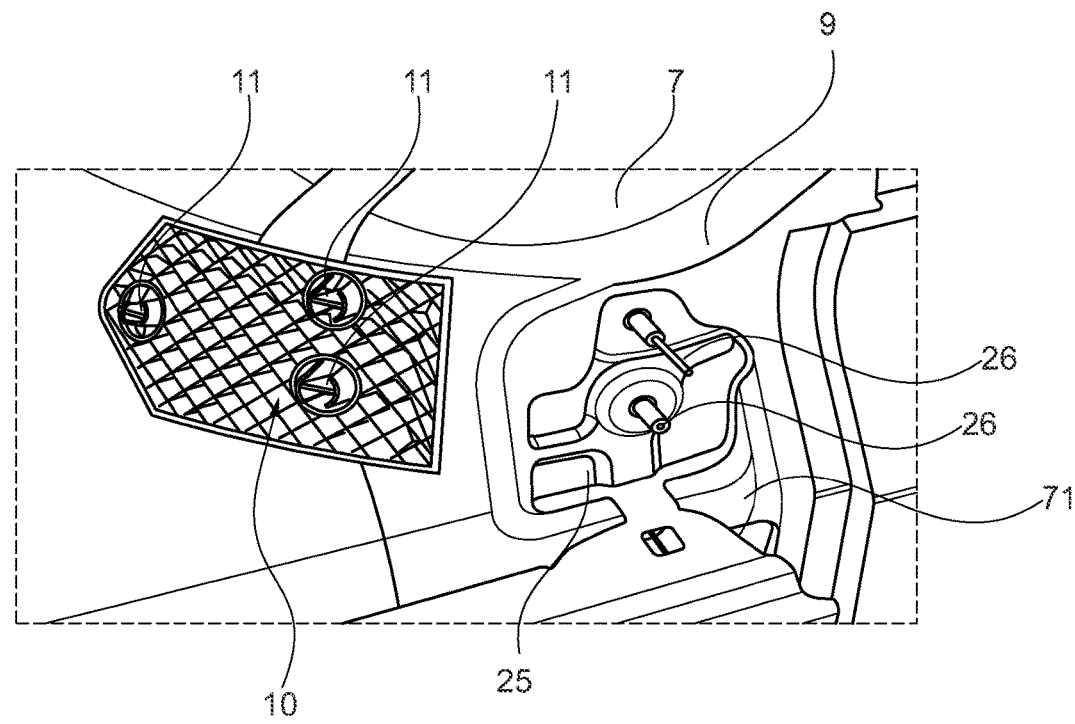

The second protecting member 20 is attachable at a front side portion 71 of the vehicle body 7 facing the rear edge 8 of the vehicle hood 3 in a closed position of the vehicle hood 3. As shown in FIG. 2, the second protecting member 20 comprises two fixing elements 23 arrangeable at the front side portion 71 of the vehicle body 7 to fixedly attach the second protecting member 20 to the vehicle body 7.

The front side portion 71 of the vehicle body 7 comprises a bracket 25, which may made of a metal material such as steel. The bracket 25 is integrally arranged at the front side portion 71 of the vehicle body 7 and comprise one or more bolts 26, which may be welded to the bracket 25. The base portion 21 of the second protecting member 20 is fixed at the bracket by means of corresponding nuts 26.

Figure 8:
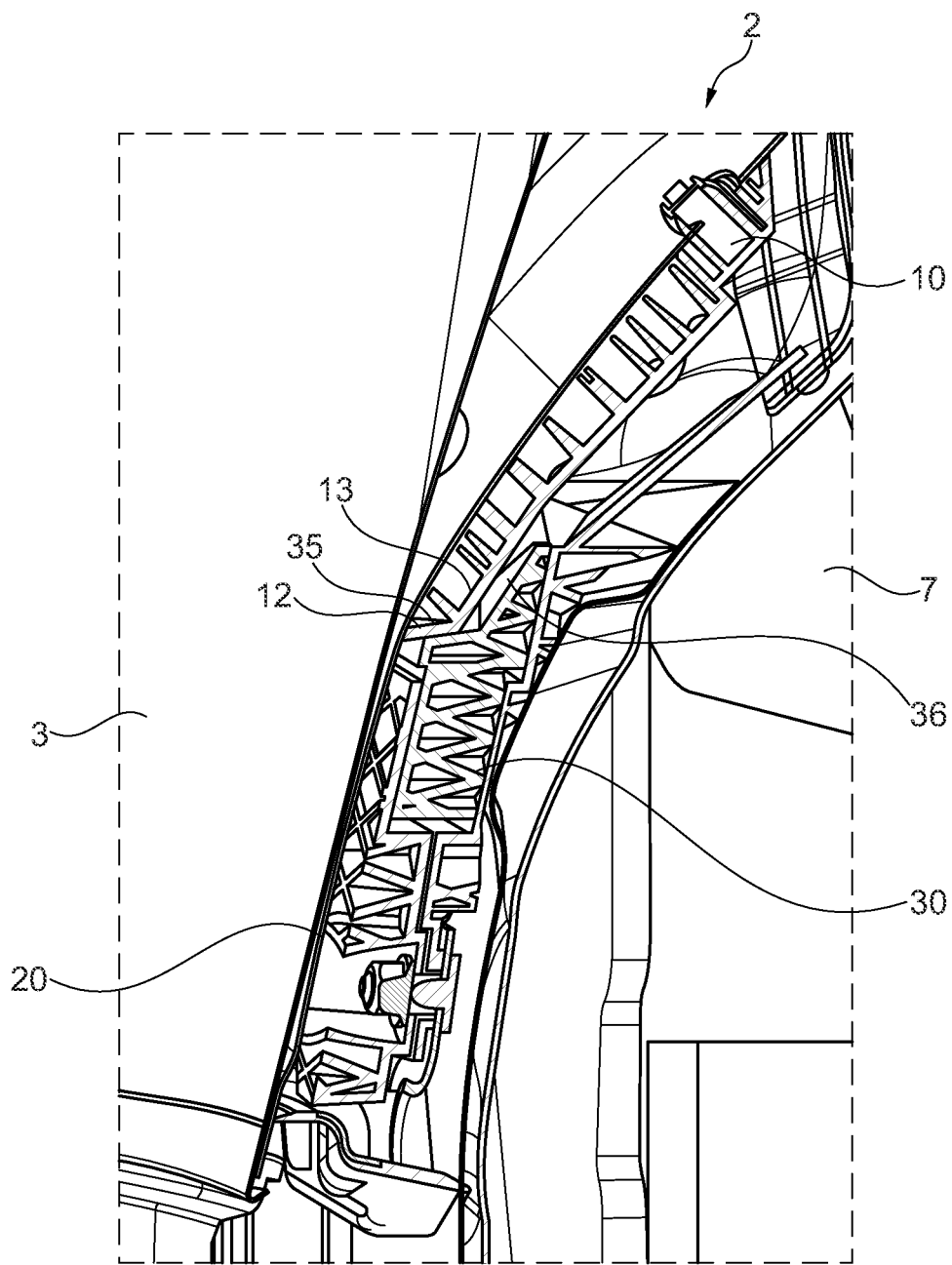
FIG. 8 shows schematically and exemplarily an embodiment of a body and doors protection assembly according to the present disclosure.

As shown in FIG. 5, the sliding member 30 is at least partially enclosed in the second protecting member 20. The sliding member 30 is configured to contact the first protecting member 10 in the closed position of the vehicle hood 3 (see FIG. 4 and FIG. 8). The sliding member 30 is adjustable in the lateral direction X relative to the vehicle hood 3 along the guide 27 of the base portion 21 of the second protecting member 20.

Figure 6:
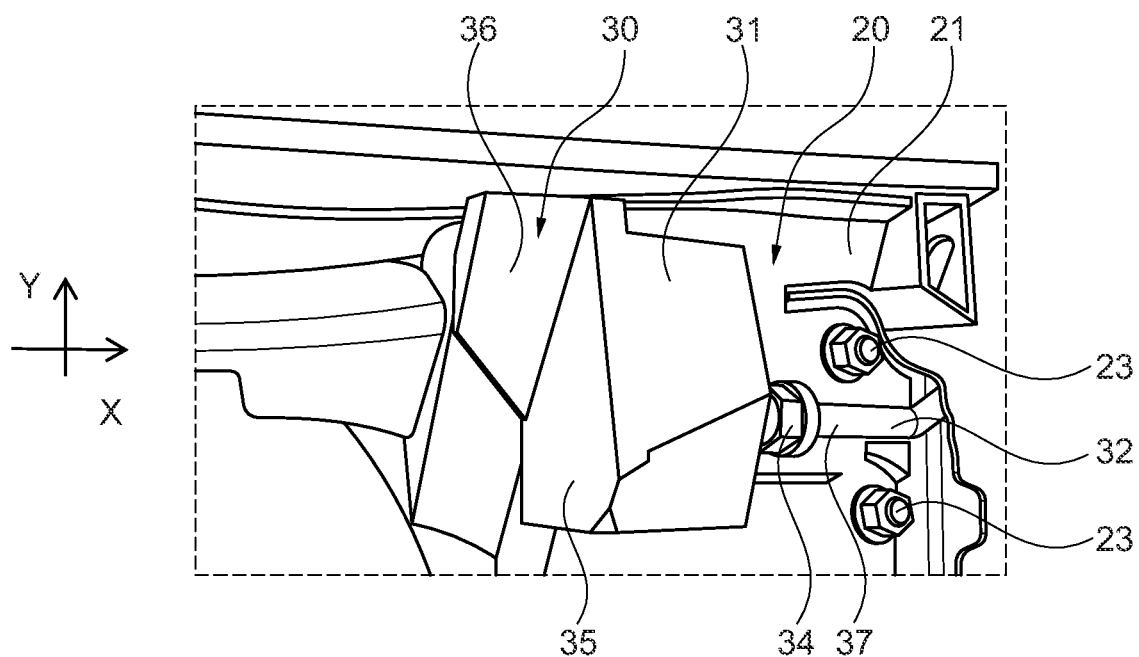
FIG. 6 shows schematically and exemplarily an embodiment of a second protecting member and a sliding member according to the present disclosure.

FIG. 6 shows the sliding member 30 comprising a sliding body 31 and a shank 32. The sliding body 31 is connected to one end 37 of the shank 32 and adjustable with the shank 32. The sliding member 30 further comprises a nut 34 arranged through the shank 32. The nut 34 is configured to keep the sliding body 31 in position along the shank 32.

As shown in FIG. 2, the sliding member 30 comprises a lateral supporting portion 35 and a longitudinal supporting portion 36. The lateral supporting portion 35 is arranged substantially perpendicular to the shank 32 and configured to block a movement of the first protecting member 10 in the lateral direction X of the vehicle hood 3. The longitudinal supporting portion 36 is arranged substantially perpendicular to the lateral supporting portion 35 and configured to block the movement of the first protecting member 10 in the longitudinal direction Y of the vehicle body 7 in case of the displacement of the vehicle hood 3.

FIG. 7 shows the first protecting member 10 comprising a lateral contacting portion 12 and a longitudinal contacting portion 13. In case of a movement of the vehicle hood 3 in the lateral direction X of the vehicle hood 3, the lateral contacting portion 12 can push the lateral supporting portion 35 of the sliding member 30 to steer out the collision energy via the sliding body. In case of a movement of the vehicle hood 3 in the longitudinal direction Y of the vehicle hood 3, the longitudinal contacting portion 13 comes into contact with the longitudinal supporting portion 36 of the sliding member 30 to stop the movement of the vehicle hood 3 in the longitudinal direction Y (see also FIG. 8).

The body and doors protection assembly 2 further comprises a seal protect member 24 arrangeable at the front side portion 71 of the vehicle body 7 and/or the junction portion 9 of the vehicle body. The seal protect member 24 surrounds at least partially the first protecting member 10, the second protecting member 20 and/or the sliding member 30 to additionally protect them in case of the displacement of the vehicle hood 3.

The front fender 6 further comprises at least one mounting means 61 configured to fasten the body and doors protection assembly 2 additionally at the front fender 6 to insulate the front fender 6.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A body and doors protection assembly for a vehicle, the body and doors protection assembly comprising
    a first protecting member;
    a second protecting member; and
    a sliding member,
        the first protecting member being attachable on an inner surface of a vehicle hood at a rear edge of the vehicle hood,
        the second protecting member being attachable in a front side portion of a vehicle body facing the rear edge of the vehicle hood in a closed position of the vehicle hood,
    the sliding member being at least partially enclosed in the second protecting member and configured to contact the first protecting member in the closed position of the vehicle hood, and the sliding member being adjustable in a lateral direction (X) relative to the vehicle hood in the closed position of the vehicle hood.

2. The body and doors protection assembly according to claim 1, the sliding member comprising a sliding body and a shank, the sliding body being connected to one end of the shank and adjustable with the shank.

3. The body and doors protection assembly according to claim 2, the sliding member further comprising a nut arranged through the shank, the nut being configured to keep the sliding body in position along the shank.

4. The body and doors protection assembly according to claim 2, the sliding member comprising a lateral supporting portion, the lateral supporting portion being arranged at an opposite side of the shank relative to the sliding body and configured to block a movement of the first protecting member in the lateral direction (X) of the vehicle hood.

5. The body and doors protection assembly according to claim 2, the sliding member further comprising a longitudinal supporting portion, the longitudinal supporting portion being arranged substantially perpendicular to the lateral supporting portion and configured to block the movement of the first protecting member in a longitudinal direction of the vehicle body.

6. The body and doors protection assembly according to claim 1, the first protecting member comprising at least one clamping element to fixedly attach the first protecting member to the inner surface of the vehicle hood.

7. The body and doors protection assembly according to claim 1, the second protecting member comprising a base portion and a cover portion, the base portion and the cover portion being connected to each other by a fastening means.

8. The body and doors protection assembly according to claim 1, the base portion of the second protecting member comprising a guide, on which the sliding member being movable.

9. The body and doors protection assembly according to claim 1, the second protecting member comprising at least one fixing element arrangeable at the front side portion of the vehicle body to fixedly attach the second protecting member to the vehicle body.

10. The body and doors protection assembly according to claim 1, further comprising a seal protect member arrangeable at the front side portion of the vehicle body and at least partially surrounding the first protecting member, the second protecting member or the sliding member.

11. The body and doors protection assembly according to claim 1, the first protecting member, the second protecting member or the sliding member being individually replaceable in case of a damage.

12. A hood assembly comprising:
a vehicle hood; and
a body and doors protection assembly, wherein the body and doors protection assembly comprises:
a first protecting member;
a second protecting member;
a sliding member,
the first protecting member being attachable on an inner surface of a vehicle hood at a rear edge of the vehicle hood,
the second protecting member being attachable in a front side portion of a vehicle body facing the rear edge of the vehicle hood in a closed position of the vehicle hood,
the sliding member being at least partially enclosed in the second protecting member and configured to contact the first protecting member in the closed position of the vehicle hood, and
the sliding member being adjustable in a lateral direction (X) relative to the vehicle hood in the closed position of the vehicle hood.

13. A vehicle comprising:
a hood assembly comprising:
a vehicle hood; and
a body and doors protection assembly, wherein the body and doors protection assembly comprises:
a first protecting member;
a second protecting member;
a sliding member,
the first protecting member being attachable on an inner surface of a vehicle hood at a rear edge of the vehicle hood,
the second protecting member being attachable in a front side portion of a vehicle body facing the rear edge of the vehicle hood in a closed position of the vehicle hood,
the sliding member being at least partially enclosed in the second protecting member and configured to contact the first protecting member in the closed position of the vehicle hood, and
the sliding member being adjustable in a lateral direction (X) relative to the vehicle hood in the closed position of the vehicle hood.

14. The vehicle according to claim 13, the body and doors protection assembly being arranged on a junction portion of a vehicle body, at which an A-pillar, a front door or a rear edge of a vehicle hood join.

15. Manufacturing method for a body and doors protection assembly in a vehicle, the manufacturing method comprising:
attaching a first protecting member on an inner surface of a vehicle hood at a rear edge of the vehicle hood;
attaching a second protecting member in a front side portion of a vehicle body facing the rear edge of the vehicle hood; and
establishing the first protecting member and the second protecting member by a sliding member in a closed position of the vehicle hood,
the sliding member being movable in a lateral direction (X) relative to the vehicle hood in the closed position of the vehicle hood.

* * * * *